United States Patent [19]
Fox

[11] 3,908,281

[45] Sept. 30, 1975

[54] REAL ESTATE APPRAISAL INSTRUMENT AND METHOD

[76] Inventor: Michael C. Fox, 4951 14th St. South, Arlington, Va. 22206

[22] Filed: Jan. 29, 1973

[21] Appl. No.: 327,805

[52] U.S. Cl. .................... 33/228; 33/262; 33/276
[51] Int. Cl.[2] .................... G01C 15/00; G01C 3/00
[58] Field of Search ............ 33/277, 276, 284, 278, 33/262, 125 A, 98, 228

[56] References Cited

UNITED STATES PATENTS

| 53,420 | 3/1866 | Daly | 33/277 |
| 913,526 | 2/1909 | Lilliendahl | 33/276 |
| 1,205,687 | 11/1916 | Verhey et al. | 33/98 |
| 1,771,903 | 7/1930 | Soth | 33/277 |
| 2,373,322 | 4/1945 | MacRae | 33/98 |

FOREIGN PATENTS OR APPLICATIONS

| 298,537 | 9/1919 | Germany | 33/276 |
| 133,458 | 10/1919 | United Kingdom | 33/277 |

Primary Examiner—Richard E. Aegerter
Assistant Examiner—Richard R. Stearns
Attorney, Agent, or Firm—Laurence R. Brown

[57] ABSTRACT

An inexpensive appraisal instrument is provided for measuring unknown dimensions of a house or building from a remote observation point such as from a car in a street near the building. The instrument is sighted and calibrated on a door, which is of a standard height, and thereby identifies by comparison the unknown dimensions such as width, height, driveway, windowframes, garage, etc., so that an appraisal report can be made without entry on the property. The instrument comprises a telescopically acting rod spacing a cross member variably from a datum-apex point so that the door may be sighted through a pair of spaced sights for calibration. There is a measurement scale in feet or meters gaged from the door dimensions on the cross member so that a second sighting from the same observation point of a member of unknown dimension establishes an angle identifying a span from which the unknown member measurement may be directly read on the measurement scale.

1 Claim, 3 Drawing Figures

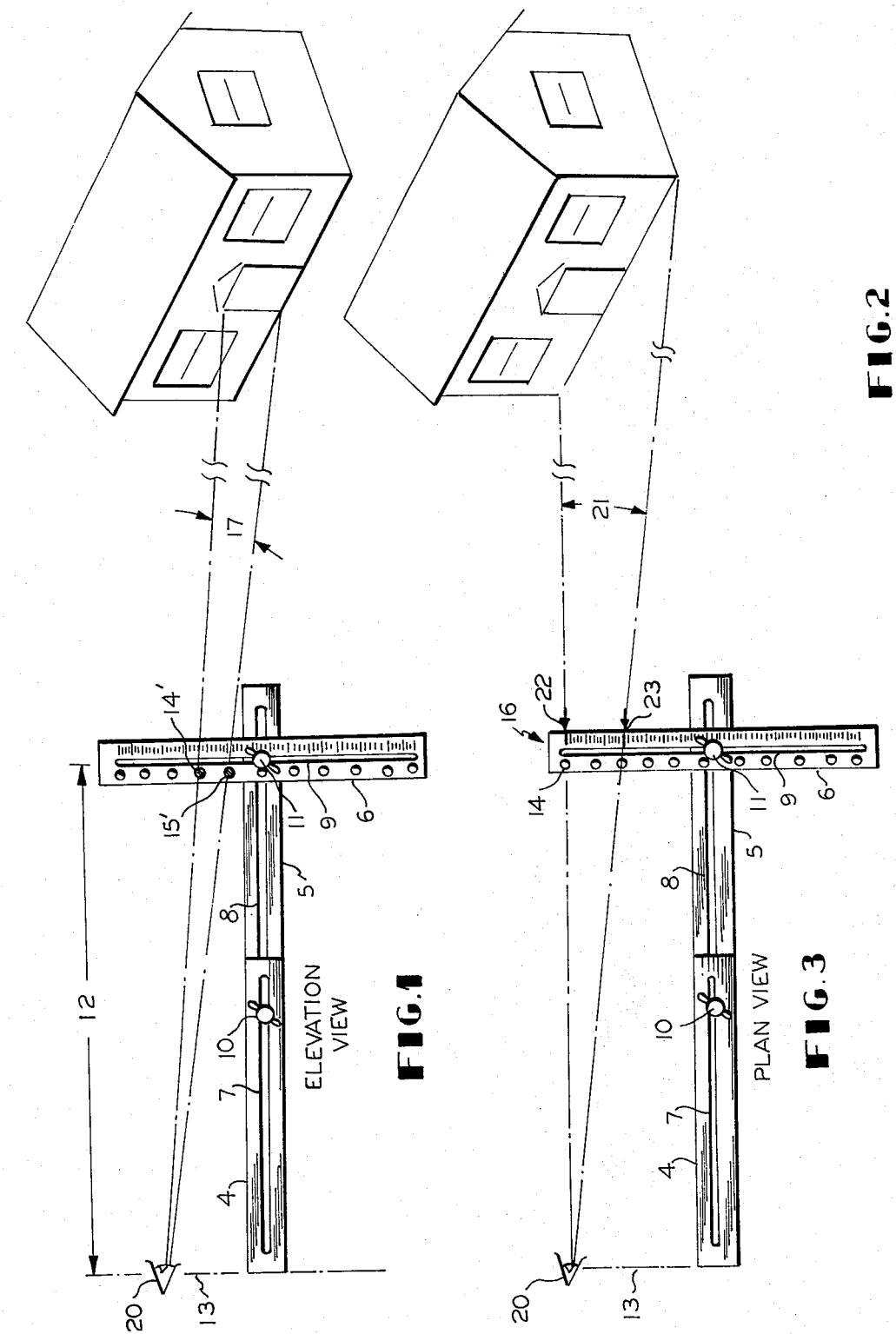

REAL ESTATE APPRAISAL INSTRUMENT AND METHOD

This invention relates to real estate appraisals and more specifically it relates to instrumentation for remotely measuring unknown dimensions of houses and buildings.

For purposes of financing and appraising real estate it is oftentimes desirable to survey and measure houses and buildings without entering the property. Some of the measurements of interest in appraisals are building length, height, width, and lot, garage or carport dimensions, etc. There has been no known simple way to take these measurements for a close estimate from a street location near the building, for example. The cost of using standard surveying methods and instruments would be prohibitive in most instances.

Accordingly it is an object of this invention to provide a simplified method and instrument for remotely appraising buildings by measuring the dimensions of a structure.

A further object of the invention is to provide a simplified and inexpensive instrument for appraising real estate.

In accordance with this invention therefore, unknown dimensions of a building are measured by comparison with a standard known dimension, such as the height of a door. This affords a simple and effective instrument in the form of a telescopically acting rod with a calibrated movable crossbar thereon. The crossbar has a set of measuring indices in feet or meters, which are calibrated by setting the crossbar position to sight a door within a pair of marker positions from a remote observation point, such as in a street adjacent the property containing the building.

Further features, objectives and advantages of the invention will be set forth in the following detailed description of an embodiment of the invention, which is shown in the accompanying drawing, wherein, FIG. 1, shows in elevation an instrument embodying the invention being calibrated by comparison with the standard height of a door, FIG. 2, shows in expanded scale a plan view of the crossbar member with corresponding index and measuring scales thereon, and FIG. 3, shows in plan-perspective view, the instrument as used in measuring an unknown length of a house.

Referring now specifically to the drawing, the measuring instrument in the shown embodiment is constructed of three longitudinal planar rectangular panel sections 4, 5, 6 each have a corresponding intermediate longitudinally disposed slot 7, 8, 9, therein. This permits the instrument to be folded to fit in a briefcase or pocket. Each panel section 4, 5, 6 may be constructed similarly to a conventional slotted scale or ruler of from 12 to 18 inches in length, with a pair of clamps 10, 11 extending through the slots and accompanying panels for holding the pieces together in a form comprising a telescopically acting rod member with a substantially normally disposed cross member 6 disposed thereon a variable distance 12 from a datum-apex position 13. The instrument could take other forms such as for example a telescopic pole member having a pivoted crossbar thereon to achieve the objectives of this invention.

It is pertinent that the crossbar have at least one pair of markings or sights 14, 15, which could be nails driven in a wood panel 6, for example. The sights are spaced a predetermined distance apart as seen from FIG. 2 where the spacing is 6 feet 8 inches indicating the height of a door generally used in construction of buildings, and used for calibrating the instrument. A different known dimension of a member on the structure being observed might be used for calibration if desired in the same manner herein described.

The scale portion of the crossbar member 6 therefore is calibrated with the index markers comprising sights 14, 15, etc. and the measuring markers comprising scale section 16.

As seen from FIG. 2, the measurement in feet (10, 20, etc.) on scale 16 is gaged from the index markers 14, 15, etc. where three times 6 feet 8 inches for example is 20 feet. The scales may be colinear if desired or on two different side by side scales as shown in FIG. 2, with the precaution that slight differences are to be made in calibration to coincide with viewing angles, as will be clarified in the description of calibration hereinafter set forth.

In FIG. 1, the calibration procedure is depicted. Thus, the position of crossbar member 6 is variably set relative to a datum position 13 which coincides with the apex of angle 17 to calibrate the scale 16. Thus, a door 18 (6 feet 8 inches high) located in the house 19 being observed for appraisal is sighted through two adjacent index markers 14, 15, preferably located near the center of the scale which coincides with the position of the longitudinal panel member 5 to thereby define an index angle 17. The longitudinal slots 7, 8 are adjusted to change the position of the crossbar member 6 as seen from an observation position 20 until the sights 14 and 15 locate the index angle 17 to subtend the door 18. The observation point 20 may be a street location adjacent the property on which the building 19 is located in the order of 50 to 100 feet away. For such observations the panels 4, 5 and 6 may be about 18 inches long and the spacing of the index markers 16–17 may be about 1½ inches to encompass an overall width measurement capacity in the order of 75 feet.

In order to take an unknown measurement, the instrument is used from the same observation point 20, and a viewing angle 21 is subtended by the unknown dimension, such as the length of house 19. Then a reference is made at the measuring marker positions 22, 23 on the scale 16 from which the measured distance can be read directly. Thus, the unknown dimension is determined by proportioning an index angle determined from the unknown dimension.

Once a measurement is calibrated by the method hereinbefore described, other measurements may be taken and used as a reference. For example, the height of the gable may be measured in feet from the front of a house by calibrating the instrument by a door as before described. Thereafter, assume the depth of the house may not be taken directly from the front but only from a different location at the side of the house where a door is not available for sighting and calibration. The instrument may then be calibrated from a side location from the known gable height measured from the front of the house location. In this respect a measuring angle such as 21 in FIG. 3 can be used as a calibrating angle subtending the gable for calibration with the distance from 22 to 23 being the known height. The length of the telescoping portion 4, 5 is adjusted from a new datum-apex position 13 to calibrate the sight points 22, 23, which are set on scale 16 from the now known dimensions of the gable.

The particular structure shown has an advantage, since it can be compacted by folding about bolts 10, 11 and stored in a briefcase after use in a three layer panel stack of about the length of a single panel 4 or 5. To extend the range an additional panel may be used to give a greater telescopic range from crossbar member 6 to the datum position 13. It is evident that the structure afforded by this invention will permit the measuring from afar of dimensions on a structure, which by definition herein could include for example, a lot line dimension, without requiring expensive lenses or complex calculations such as required in prior art surveying techniques.

From the foregoing, the structure of the instrumentation and the manner of employing the teachings of this invention are set forth in an illustrative embodiment. It is noted that the simplicity objectives of the invention are met by a structure that does not require lenses and other expensive or critical optical or mechanical members.

What is claimed is:

1. The method of remotely measuring dimensions of a structure such as the width or height of a building from a distance that may vary within predetermined limits, comprising the steps of,
   a. establishing a pair of index markers separated by a predetermined distance,
   b. establishing by selection a position spaced a predetermined distance from said markers as an apex point for an index angle identified by said markers by subtending with said index angle a member of known dimension on said structure, such as a door, from an observation point,
   c. subtending from said observation point and said apex point an unknown dimension on said structure by a measuring angle,
   d. establishing a pair of measuring markers at the same said predetermined distance from said apex point as said index markers identifying said measuring angle, and
   e. proportioning said index angle to said measuring angle to determine the unknown dimension.

* * * * *